United States Patent [19]

Massey

[11] 4,407,454

[45] Oct. 4, 1983

[54] SPRAY SYSTEM

[75] Inventor: Billy G. Massey, House Springs, Mo.

[73] Assignee: Whitmire Research Laboratories, Inc., St. Louis, Mo.

[21] Appl. No.: 277,996

[22] Filed: Jun. 26, 1981

[51] Int. Cl.³ .............................................. B05B 9/08
[52] U.S. Cl. .................................... 239/154; 239/525
[58] Field of Search ............. 239/525, 152, 337, 375, 239/373, 153, 154; 222/136, 175, 396, 394

[56] References Cited

U.S. PATENT DOCUMENTS

| | | | |
|---|---|---|---|
| 753,125 | 2/1904 | Cooper | 239/525 X |
| 772,454 | 10/1904 | Brandt | 239/152 |
| 2,548,196 | 4/1951 | Clark | 239/525 X |
| 2,911,157 | 11/1959 | Converse | 239/152 X |
| 3,343,804 | 9/1967 | Pinke | 239/152 X |
| 3,352,364 | 11/1967 | De Coste | 239/152 X |
| 3,945,571 | 3/1976 | Rash | 239/152 |
| 4,162,764 | 7/1979 | Millsap | 239/152 |

Primary Examiner—Johnny D. Cherry
Assistant Examiner—Gene A. Church
Attorney, Agent, or Firm—Paul M. Denk

[57] ABSTRACT

In a spray system that facilitates its usage by the exterminator including a reservoir for holding an ample supply of the insecticide or other fluid, with the reservoir being held by a pouch to the belt or to other locations upon the user, a spray actuator coupled by means of a length of coiled hose to the reservoir, so that the operator need only manipulate the actuator to attain either a spray fogging or stream application of the insecticide; the hose connects to the reservoir through a valve member that attaches by means of a clamp and adaptor to the upper arranged port of the insecticide reservoir.

16 Claims, 6 Drawing Figures

SPRAY SYSTEM

BACKGROUND OF THE INVENTION

This invention relates generally to means for spraying a fluid, such as an insecticide, or other liquid, but more specifically pertains to a unique portable type insecticide sprayer or stream applicator and wherein its bulkier components may be supported upon the user, while its hand held light weight applicator may be conveniently and easily manipulated by its user.

The spraying of insecticides or other type fluids has long been a part of the art, and contemporaneously, if not for the past twenty years, the use of aerosol type containers holding a supply of pressurized insecticide and which can be sprayed through the manipulation of its actuator and valve system has certainly been in vogue. This is the main method adapted as the most feasible for spray application of insecticides by the retail public.

Obviously, in the commercial exterminating field, it is unlikely and noneconomical for the exterminator to continuously use the aerosol can type of sprayer, since not only is it quite bulky, and difficult to attain access into those rather inaccessible areas where the exterminator needs to apply some insecticide, which are usually the locations where those working in the pest control field must perform their services if they are to be successful and efficient. In addition, the rather bulky aerosol cans are quite cumbersome, and it is near impossible for the operator to bring a sufficient supply of the same to the situs of treatment in order to perform a commercially bid job.

As a result of the foregoing, the current invention has been devised utilizing a rechargeable reservoir of pressurized insecticide, and which reservoir, because of its weight or size, may be suspended through a pouch or other means to its user, thereby requiring no physical exertion on the part of the pest controller during its usage while incorporating a hose means that interconnects with a hand size spray gun applicator that is light in weight, small in size, and therefore convenient for usage in allowing the operator to attain successful and efficient results in treating a premises in the category of a restaurant, hotel, hospital or the like. It does not appear that this assembly of components for use in the pest control field has been given consideration by anyone in the prior art, and for the method of use as will be more fully explained in this application. But, the concept of providing a means for pressurizing fluid, and then transferring by means of a hose to a spray applicator has been at least considered in the prior art. For example, in the U.S. patent to Avens, U.S. Pat. No. 2,738,227, therein is disclosed a fluid spraying device, wherein a portable storage apparatus for holding a fluid also incorporates means for applying pressure to it, and thereby forcing its passage through a short length of hose to a nozzle for discharge. Thus, while the use of a short length of hose has been considered by the prior art, the actual usage of a longer length of hose to a spray applicator or gun from a prepressurized reservoir of insecticide or other fluid has not apparently been previously considered. The utility of such can be easily understood by anyone skilled in this art, and particularly those involved in the commercial pest control field.

It is, therefore, the principle object of this invention to provide a spraying system for insecticide or the like wherein its inactive components may be suspended to the user alleviating his need to be concerned with it, while the actual portable and lightweight spray gun means is available for ready manipulation and usage even within the proximity of almost inaccessible areas during insecticide applications.

Another object of this invention is to provide a system of spray gun applicator, coiled hose, valve means, and insecticidal reservoir that can all be quickly and easily coupled together, by the operator in the field, in preparation for his immediate treatment of a likely infested area.

Still another object of this invention is to provide a spraying system wherein its pressurized reservoir of insecticide, when depleted, can be conveniently refilled in situ for further usage.

Yet another object of this invention is to provide novel valve adaptor and clamp means that quickly affords a connection of these various components of this spray system together during field usage.

Yet another object of this invention is to provide a spray gun body that is formed from a variety of components that when interconnected together furnish an easily handable applicator available for ready usage.

Still another object of this invention is to provide a spray gun body and applicator and wherein its various injectors can be easily replaced in order to provide for either a spraying, stream, fogging or other application of insecticide to the treated area.

Still another object of this invention is to provide a combination of a pouch and/or belt and to which the insecticide filled reservoir can be conveniently suspended upon the body of its user.

These and other objects will become more apparent to those skilled in the art upon reviewing the summary of this invention, and upon undertaking a study of the description of its preferred embodiment in view of the drawings.

SUMMARY OF THE INVENTION

This invention is concerned with the assembly of a variety of components that ease the work of the pest controller in undertaking commercial treatment of various facilities, particularly those that require periodic inspection and treatment, such as the restaurant, hotel, hospital, and similar type facilities. The variety of components that make up the assembled spray system of this invention include a reservoir that is in the category of a pressurized insecticide can, that is capable of holding and being recharged with a quantity of such type insecticidal fluid, a clamping means, and which is useful for holding a manipulative adaptor and valve onto the reservoir, and which valve when turned off prevents the discharge of the pressurized fluid from said reservoir, but when turned on, and by opening of its valve, allows for the passage of the pressurized insecticide from the reservoir and into a length of hose, which for the sake of compactness, is conveniently coiled. The opposite end of the hose connects with a spray means, which includes a spray gun body, that in and of itself has a small chamber for holding some of the insecticide that is transferred to it from the reservoir, with the spray gun body having a spray actuator, including replaceable or alternative usable actuator heads that can either provide a fogging, spraying, or stream delivery of insecticide to the situs of treatment. An advantage of this type of system is that the reservoir of the insecticide holding container incorporates its own valve means within its head portion, at its outlet port, and when the reservoir becomes depleted, or nearly depleted, of its supply of insecticide, it can be recharged by the operator from a supply source, at the location of treatment, within a minimum of time so that no lost effort will be required to complete the commercial treatment of the previously enumerated types of facilities.

DESCRIPTION OF THE PREFERRED EMBODIMENT

Figure 1:
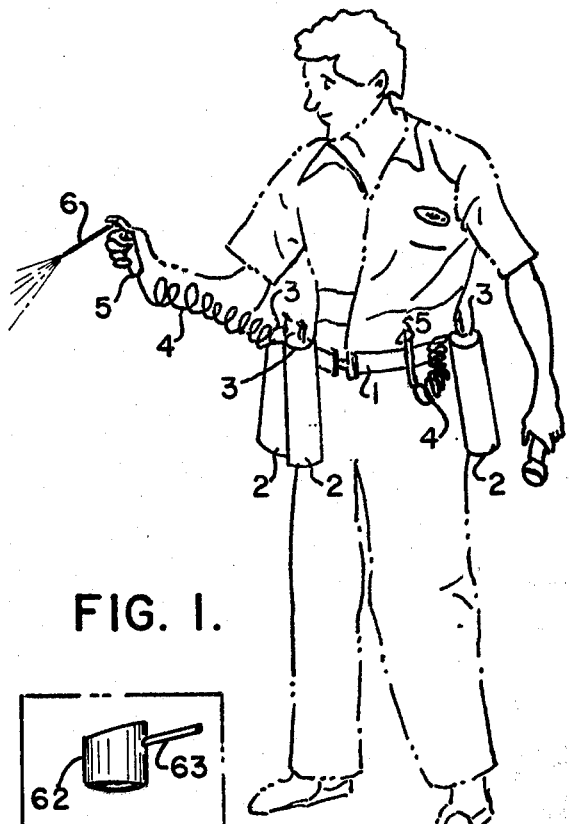
FIG. 1 provides a view of an exterminator wherein one or more of the insecticide containing reservoirs are strapped and supported upon his waist, and discloses the coiled hose connecting with one reservoir to the spray gun actuator from which insecticide is in the process of being delivered.

In referring to the drawings, and in particular FIG. 1, there is disclosed the user or pest control operator having either his own or the belt of this invention 1 applied to his waist, and disclosing a series of pouches 2 applied to said belt, and useful for holding the insecticide containing reservoirs 3 that make up part of the spray system of this invention. As can be seen, a coiled hose 4 extends from some of the reservoirs, and these hand held spray applicators 5 are available for usage, one as shown being held by the exterminator during application of a spray from a stem injector, as at 6, while the other actuator 5 is shown clipped onto the belt of the user.

Figure 2:
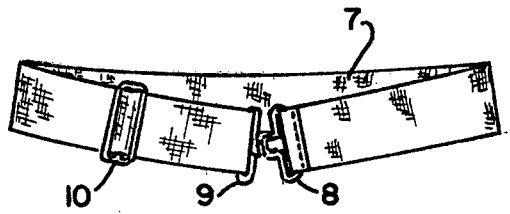
FIG. 2 provides a front view of the belt utilized with this system.
Figure 3:
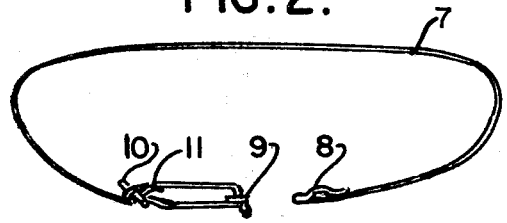
FIG. 3 provides a top view of the adjustable belt of this invention.

As can be seen in FIGS. 2 and 3, the particular preferred type of belt to be used with this system comprises a nylon or other sturdy material formed length of belt, as at 7, having hook-like connecting means 8 and 9, formed at its ends, with an adjustment bracket 10 formed securing with the specific end 11 of the belt to provide convenient adjustment of the belt 7 into desired lengths.

Figures 4, 5:
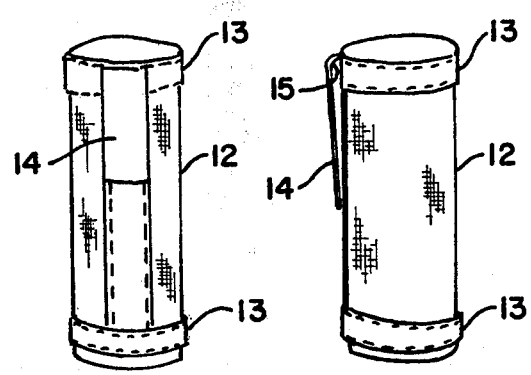
FIG. 4 provides a side view of the pouch for holding the insecticide reservoir.
FIG. 5 discloses a front view of the said pouch.

As can be seen in FIGS. 4 and 5, the unique pouch of this invention includes a cylinder-like member 12, formed of nylon or other sturdy material, being reinforced by marginal bands 13, at its upper and lower ends, and having a strap 14 secured along one side and forming a loop, as at 15, and through which the belt 7 may insert. Thus, as can also be seen in FIG. 1, the pouch conveniently fits upon the belt of the user thereby providing convenient means in which the pressurized insecticide containing reservoirs may be supported, freeing the hands of the user for other purposes, such as for manipulation of the lightweight spray actuators of this invention, and which will be subsequently described in detail.

Figure 6:
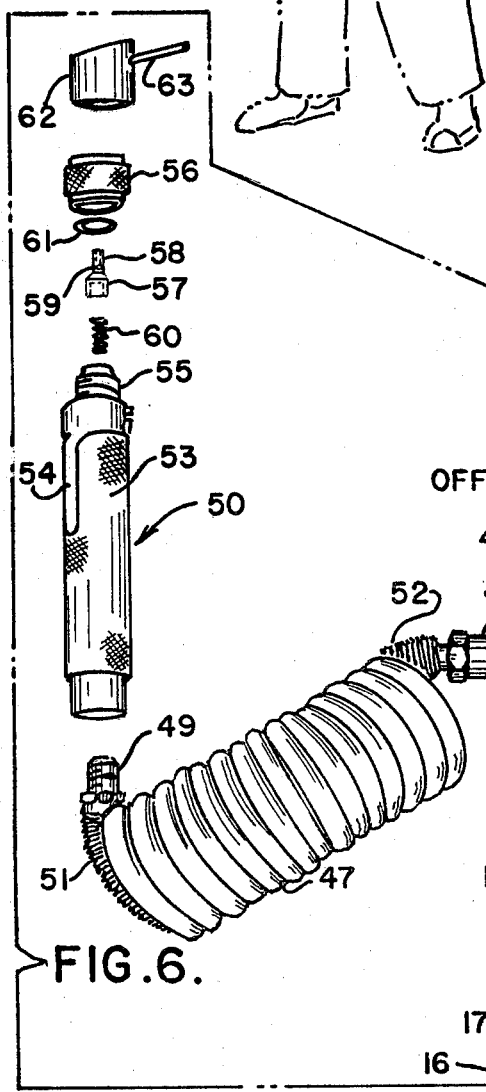
FIG. 6 provides an exploded view of the variety of reservoir, clamp means, adaptor, valves, coiled hose, and spray gun body and actuators utilized in the formation of the spray system of this invention.

In referring to FIG. 6, the actual components that make up the spraying system for this invention are disclosed. They comprise, as partially shown an insecticide reservoir 19, the pressure cap 17 being shown applied thereon, and an internal valve that forms its outlet port, as at 18, through which the insecticide may be discharged once the accompanying valve is depressed.

A clamp means 19 is provided for securement upon the upper marginal lip 20 of the reservoir or insecticide can 16, and this clamp means comprises an integral band means 21 that partially surrounds the lip 20 of the reservoir, and cooperates with a cam means 22 wich when closed, forms a tight engagement for the clamp means with the upper end of the said reservoir. The cam means 22 is pivotally mounted, as by means of the pivot pin 23, to an integral tab 24 of the said clamp, with the said cam means being shown in its disengaged position, as at 25, and during its engagement, as at 26, wherein its camming surface 27 comes tightly into engagement against said marginal lip 20 of the said reservoir. An integral gripping means, as at 28, includes a bent back thumb engaging portion 29, which is conveniently disposed for facilitating the amount of pressure that is required for either the hand attachment or removal of the clamp means upon the said reservoir.

A valve means 30 operatively associates with the clamp means, to provide for mounting upon the insecticide reservoir, and this valve means includes a tee valve 31, the downwardmost stem of which is threaded, as at 32, and disposed for engaging within a valve-clamp adaptor 33, its lower end of which is also threaded, as at 34, for engaging within similar type threads provided, as at 35, within the clamp means 19. This valve-clamp adaptor includes an insert, as at 36, that is designed to be self-centering, and for sealing onto the male aerosol valve stem or port 18, provided upon the upper edge of the reservoir 16, to compress thereon, when fully tightened in place, so as to provide for the continuous discharge of insecticide out of the reservoir, and into the valve 31.

The tee valve body 31 incorporates a series of passageways therethrough, as can be seen, and a valve seat as at 37. The passageway 38 extends entirely through the shown valve, while a branch passage 39 is provided through the tee section 40 and communicates with the passage 38 by means of the channel 41. The valve operating mechanism is shown in 42, and includes a spring biased valve 43 having an O ring 44 thereon, so as to provide for tis convenient sealing within the passage 38, and of the valve 43 against the valve seat 37. A spring (not shown) is located within the member 42, and has an off-on handle 43 arranged pivotally mounted upon the stem 44. When the handle 43 is depressed downwardly, as shown at 45, the stem is biased by means of the spring 44 downwardly, so that its valve 43 seats upon the valve seat 37, preventing the access of insecticide through the passage 41, or into the passage 39. And, when the handle 43 is raised into the position shown in 46, it withdraws the valve 43, and the stem 44 against the bias of the aforementioned spring, thereby lifting said valve off of its seat 37, and allowing pressurized insecticide or other fluid to by-pass passage 41, and into the passage 39.

The coiled hose 47 connects onto a fitting 48 and which fitting threadedly engages onto the branch portion 40, as previously shown. The opposite end of the coiled hose 47 has another fitting 49, and said fitting engages onto the bottom end of the valve means or more specifically the spray body 50, by threadedly engaging therein. A pair of coiled spring hose orienting members 51 and 52 connect at opposite ends of the coiled hose, in order to maintain it into its helical position, as shown, and to prevent the hose from being bent too frequently at the location of its connection to said fittings, in order to prevent accelerated or untimely fracturing of the said hose at these locations.

The spray gun body 50 comprising a length of cylinder, as shown, which is knurled upon its outer surface, as at 53, to facilitate its grasping by the hand of the operator, and in addition, includes a clip, as at 54, to add to the convenient securement of the spray means or gun body onto the operator's person, as previously explained in FIG. 1.

The interior of the cylinder 50 includes a chamber, so as to provide for a supplemental pocket for collection of pressurized insecticide or other fluid during usage of this invention, and to assure a uniform delivery of insecticide to the spray applicator, as will be subsequently described.

The upper end of the body 50 includes an integral stem, threaded as shown at 55, so as to accommodate the knurled valve cap 56 thereon. Interiorly of the valve cap is located a valve stem 57, the upper portion of the stem of which contains a passageway, as at 58, and which opens through the aperture 59 into the chamber contained within the body portion 50. A spring 60 normally biases the valve stem 57, and its closure washer 61 upwardly within the interior of the cap 56, to normally maintain it in closure. But, when a valve cap actuator, one as shown at 62, is depressed downwardly, and thereby depressing the valve stem 57 against the bias of its spring 60 also downwardly into the stem 55 of the body portion 50, the aperture 59 becomes opened, allowing for pressurized insecticide or fluid to pass through the stem passageway 58 provided through the upper part of the valve stem 57, and upwardly into the cap 62, for discharge out of its spout 63.

To be more particular, the lower end of the valve stem 57, as shown at its lower expanded end, has a shallow cavity contained therein, in which the spring 60 fits, and said spring also biases upon a shoulder (not shown) contained within the valve body stem 55, which shoulder also has a small passageway therethrough for allowing the pressurized insecticide to pass when the actuator cap 62 is depressed for providing a spray, fogging, or stream delivery of insecticide.

Various types of actuator caps are available in the art, such as the stream type of cap 62 as shown, or other forms of caps for providing fogging, spray delivery, or the like, are also available for this purpose.

Variations or modifications to the components of this invention may occur to those skilled in the art upon reviewing this disclosure. Such variations or modifications if within the spirit of this invention are intended to be encompassed within the scope of any claims to patent protection issuing hereon. The description of the preferred embodiment provided herein, in addition to the views set forth in the drawings, are provided mainly for illustrative purposes only.

Having thus described the invention what is claimed and desired to be secured by Letters Patent is:

1. A spraying system for use in conveniently delivering a fluid such as an insecticide or the like and facilitating the spray applicator's usage by segregating the bulkier fluid reservoir from its more manipulative spray applicator comprising a reservoir for holding a quantity of pressurized insecticide or the like and having a discharge port therein, a clamp means secured upon the upper end of the said reservoir, a valve means incorporating an outlet connecting upon said reservoir and capable of closing off the transfer of insecticide from the same or opening for delivering insecticide from the said reservoir, a length of hose, spray means, said hose connecting said reservoir and operative valve means and with the said spray means, said spray means including a portable sprayer body, a spray actuator, said sprayer body including a cylinder chamber providing a supplemental pocket for collection of pressurized insecticide for charging of its spray means and for assuring a uniform delivery of insecticide to said spray actuator, said spray actuator provided upon said body and when actuated providing for a delivery of insecticide to its intended location provided the said valve means has been opened.

2. The invention of claim 1 and wherein said clamp means includes at least a partial band means disposed for embracing the reservoir at its upper end proximate the location of its insecticide discharge port, a cam means upon actuation capable of tightening the clamp means onto the said reservoir, said cam means being pivotally mounted to the said clamp means.

3. The invention of claim 2 and wherein said cam means includes a formed gripping means to facilitate the forced attachment or removal of the said clamp means upon the reservoir.

4. The invention of claim 2 and wherein said valve means includes a valve seat, a valve capable of opening or closing with respect to said valve seat, a handle means connecting to said valve and when arranged in one direction closing off its valve to prevent discharge of insecticide from the reservoir, and when arranged in another direction providing an opening of the said valve and providing for passage of the insecticide from the said reservoir.

5. The invention of claim 4 and wherein said spray actuator provided upon said spray means body being removable to provide for the application of alternative applicator heads that furnish a fogging, spraying or stream delivery of insecticide.

6. The invention of claim 5 and wherein said spray applicator includes a valve which when actuated by the manipulation of the spray actuator head provides discharge of accumulated insecticide from the spray means body.

7. The invention of claim 6 and wherein said spray means body includes said cylinder having an insecticide holding chamber therein, the hose connecting with one end of the said cylinder, and the spray actuator securing upon the opposite end of the cylinder.

8. The invention of claim 7 and wherein said spray means body having friction means provided upon its surface to facilitate its grasping.

9. The invention of claim 8 and wherein said friction comprises knurling.

10. The invention of claim 6 and including a cap provided upon said spray means body and useful for holding the said spray actuator valve therein.

11. The invention of claim 10 and wherein said cap is knurled.

12. The invention of claim 1 and wherein said reservoir capable of being suspended upon the user.

13. The invention of claim 12 and including a pouch supported upon the system's user and useful for holding the insecticide reservoir.

14. The invention of claim 1 and including a clip provided upon the spray means body and useful for attachment of the spray means to the user during nonuse.

15. The invention of claim 1 and including can adaptor provided for securing onto the reservoir port and held in position by the said champ means, said adaptor useful for securing the open-close valve means to the insecticide reservoir.

16. The invention of claim 15 and wherein said valve means clamp means adaptor includes a self centering insert for mounting onto the reservoir port.

* * * * *